US012762448B2

(12) United States Patent
Murthy et al.

(10) Patent No.: US 12,762,448 B2
(45) Date of Patent: Oct. 13, 2026

(54) STRATEGIZING DISTRIBUTED SYSTEMS USING QUANTUM SIMULATION

(71) Applicant: Bank of America Corporation, Charlotte, NC (US)

(72) Inventors: Anbarasan Murthy, Chennai (IN); Kiran Thomas, Chennai (IN); John Iruvanti, Kothagudem (IN)

(73) Assignee: Bank of America Corporation, Charlotte, NC (US)

( * ) Notice: Subject to any disclaimer, the term of this patent is extended or adjusted under 35 U.S.C. 154(b) by 504 days.

(21) Appl. No.: 18/371,555

(22) Filed: Sep. 22, 2023

(65) Prior Publication Data

US 2025/0103931 A1 Mar. 27, 2025

(51) Int. Cl.
*G06N 10/20* (2022.01)

(52) U.S. Cl.
CPC .................................... *G06N 10/20* (2022.01)

(58) Field of Classification Search
CPC ...................................................... G06N 10/20
See application file for complete search history.

(56) References Cited

U.S. PATENT DOCUMENTS

| | | | | |
|---|---|---|---|---|
| 11,010,233 | B1 | 5/2021 | Golden et al. | |
| 11,593,017 | B1 | 2/2023 | Chang et al. | |
| 11,637,896 | B1 | 4/2023 | Prakashaiah et al. | |
| 11,650,749 | B1 | 5/2023 | Tran et al. | |
| 11,714,930 | B2 | 8/2023 | Ramanasankaran et al. | |
| 11,761,653 | B2 | 9/2023 | Sinha et al. | |
| 11,762,353 | B2 | 9/2023 | Park et al. | |
| 11,762,764 | B1 | 9/2023 | Kirkpatrick et al. | |
| 11,765,224 | B1 | 9/2023 | Jenkins et al. | |
| 12,045,882 | B1 * | 7/2024 | Altunata | G06Q 40/04 |
| 2020/0218452 | A1 | 7/2020 | Niven et al. | |
| 2021/0326047 | A1 | 10/2021 | Sillifant et al. | |
| 2022/0382455 | A1 | 12/2022 | Lee et al. | |

(Continued)

OTHER PUBLICATIONS

Quetschlich—Predicting Good Quantum Circuit Compilation Options (Year: 2023).*

(Continued)

*Primary Examiner* — Omar F Fernandez Rivas
*Assistant Examiner* — Shamcy Alghazzy
(74) *Attorney, Agent, or Firm* — Banner & Witcoff, Ltd.

(57) ABSTRACT

Aspects of the disclosure relate to strategizing distributed systems using quantum simulation. A quantum simulation platform may train a quantum simulation model (QSM) and an encoding model. The platform may generate a digital twin of a distributed software system (DSS). The platform may generate a directed acyclic graph (DAG) based on source code for updating the DSS. The platform may generate encoded vectors using the DAG and the encoding model. The platform may generate a source code matrix based on generating distribution assessments for the encoded vectors. The platform may generate a configuration matrix based on generating change vectors using the digital twin. The platform may generate execution scenarios and optimization scores using the QSM, based on inputting the matrices. The platform may identify an optimal execution scenario. The platform may cause one or more updates the DSS based on the optimal execution scenario.

20 Claims, 11 Drawing Sheets

(56) References Cited

U.S. PATENT DOCUMENTS

| | | | | |
|---|---|---|---|---|
| 2022/0391124 | A1 | 12/2022 | Darji et al. | |
| 2023/0110591 | A1 | 4/2023 | Routt et al. | |
| 2023/0172534 | A1 | 6/2023 | Novack et al. | |
| 2023/0195373 | A1 | 6/2023 | Pabón et al. | |
| 2023/0214925 | A1 | 7/2023 | Cella et al. | |
| 2023/0259202 | A1 | 8/2023 | Doken | |
| 2023/0281177 | A1 | 9/2023 | Kannan et al. | |
| 2023/0281527 | A1 | 9/2023 | Cella et al. | |
| 2023/0289340 | A1 | 9/2023 | Cella et al. | |
| 2023/0359922 | A1* | 11/2023 | Klimov | G06N 10/70 |
| 2024/0168857 | A1* | 5/2024 | Ahuja | G06F 11/3409 |
| 2024/0355089 | A1* | 10/2024 | Rahmes | G06N 3/08 |

OTHER PUBLICATIONS

Vadali—Quantum circuit fidelity estimation using machine learning (Year: 2022).*

* cited by examiner

STRATEGIZING DISTRIBUTED SYSTEMS USING QUANTUM SIMULATION

BACKGROUND

Aspects described herein are related to strategizing distributed systems using quantum simulation. In some instances, entities such as an enterprise organization (e.g., a financial institution, and/or other institutions) may utilize one or more systems to solve problems related to a business venture pursued by the entity. In some instances, enterprise organizations may utilize distributed software systems (DSS) to solve one or more problems. A DSS may be configured to manage multiple devices (e.g., computers, servers, databases, or the like) that run multiple processes in parallel to address different aspects of a problem. A downside to DSS technology is that such systems are harder to design and program because the number of processes running in parallel may require independent updates to different variables related to the system. Conventional solutions to the design issues associated with DSS technology utilize manual trial and error approaches, where code for updating the DSS is tested manually in a live version of the DSS. Such methods lead to issues including resource contention between devices on the DSS and denial of service to users of the shared infrastructure. Accordingly, it may be important to provide an improved process for updating a DSS that does not require manual trial and error in a live version of the DSS.

SUMMARY

Aspects of the disclosure provide effective, efficient, scalable, and convenient technical solutions that address and overcome the technical problems associated with current methods of strategizing distributed systems. In accordance with one or more arrangements of the disclosure, a computing platform with at least one processor, a communication interface, and memory storing computer-readable instructions may train a quantum simulation model (QSM) based on a plurality of historical execution scenarios and a plurality of historical optimization scores corresponding to the plurality of historical execution scenarios. Training the QSM may configure the QSM to output optimization scores based on input of source code matrices and input of configuration matrices. The computing platform may generate a digital twin of a distributed software system (DSS). The digital twin may include a virtual representation of the DSS. The computing platform may generate, by parsing source code corresponding to the DSS, a directed acyclic graph (DAG) of the source code. The computing platform may generate, using the DAG, a plurality of encoded vectors of the source code and a plurality of distribution assessments. Each distribution assessment may include a potential organization of a plurality of associated encoded vectors, of the plurality of encoded vectors, for performing a function. The computing platform may generate, based on the plurality of distribution assessments, a source code matrix comprising information of the plurality of distribution assessments. The computing platform may generate, based on the digital twin, a plurality of change vectors. Each change vector may include configuration information corresponding to the digital twin. The computing platform may generate a configuration matrix including information of the plurality of change vectors. The computing platform may generate a plurality of execution scenarios for executing the source code and a plurality of optimization scores based on inputting the source code matrix and the configuration matrix into the QSM. Each optimization score may correspond to a different execution scenario of the plurality of execution scenarios. The computing platform may identify an optimal execution scenario. The computing platform may cause one or more updates to the DSS based on the optimal execution scenario. The computing platform may update the QSM based on the optimal execution scenario.

In one or more arrangements, the computing platform may train an encoding model based on a training set of historical DAGs of source code. Training the encoding model may configure the encoding model to output encoded vectors based on input of DAGs of source code. In these arrangements, generating the plurality of encoded vectors of the source code may include inputting the DAG into the encoding model and mapping variations included in nodes of the DAG to positions of encoded vectors based on correlations indicating similarities between functions included in the source code. The computing platform may update the encoding model based on a decoded representation of the optimal execution scenario.

In one or more examples, the computing platform may monitor the DSS. The computing platform may identify one or more configuration changes to the DSS based on the monitoring. The computing platform may periodically update the digital twin based on the one or more configuration changes. In one or more arrangements, the digital twin may include a virtual representation of both a plurality of devices corresponding to the DSS and a plurality of applications included in the DSS.

In one or more arrangements, the DAG may include a plurality of nodes and a plurality of edges. Each node may correspond to a function included in the source code. Each edge may correspond to one or more correlations between functions included in the source code. In one or more examples, the source code may be received by the computing platform and from a developer desk. In one or more arrangements, each encoded vector, of the plurality of encoded vectors, may correspond to source code for performing a variant of a function included in the source code. In one or more examples, the configuration information corresponding to the digital twin may include one or more data distributions of a plurality of devices corresponding to the DSS and one or more clusters of information corresponding to one or more applications included in the DSS.

In one or more arrangements, generating the plurality of execution scenarios may include comparing the source code matrix to the plurality historical execution scenarios using the QSM. Generating the plurality of execution scenarios may also include identifying, based on the comparing, one or more correlations between the source code and one or more historical execution scenarios of the plurality of historical execution scenarios. Generating the plurality of execution scenarios may also include generating one or more execution scenarios for each variation, of a plurality of variations, of each function included in the source code based on the one or more correlations and based on the information of the plurality of distribution assessments.

In one or more examples, identifying the optimal execution scenario may include comparing the plurality of optimization scores to a threshold score and identifying, based on the comparing, a plurality of optimization scores that satisfy the threshold score. Identifying the optimal execution scenario may include selecting an execution scenario corresponding to an optimization score that satisfies the threshold score and exceeds every other optimization score of the plurality of optimization scores as the optimal execution scenario.

In one or more arrangements, identifying the optimal execution scenario may include comparing the plurality of optimization scores to a threshold score and identifying, based on the comparing, a first optimization score that satisfies the threshold score. Identifying the optimal execution scenario may include selecting an execution scenario corresponding to the first optimization score as the optimal execution scenario. In one or more examples, the one or more updates to the DSS may include one or more of: adding one or more application to the DSS, adding source code corresponding to one or more functions to the DSS, removing one or more application from the DSS, removing source code corresponding to one or more function from the DSS, modifying one or more applications included in the DSS, or modifying source code corresponding to one or more functions included in the DSS.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1A:
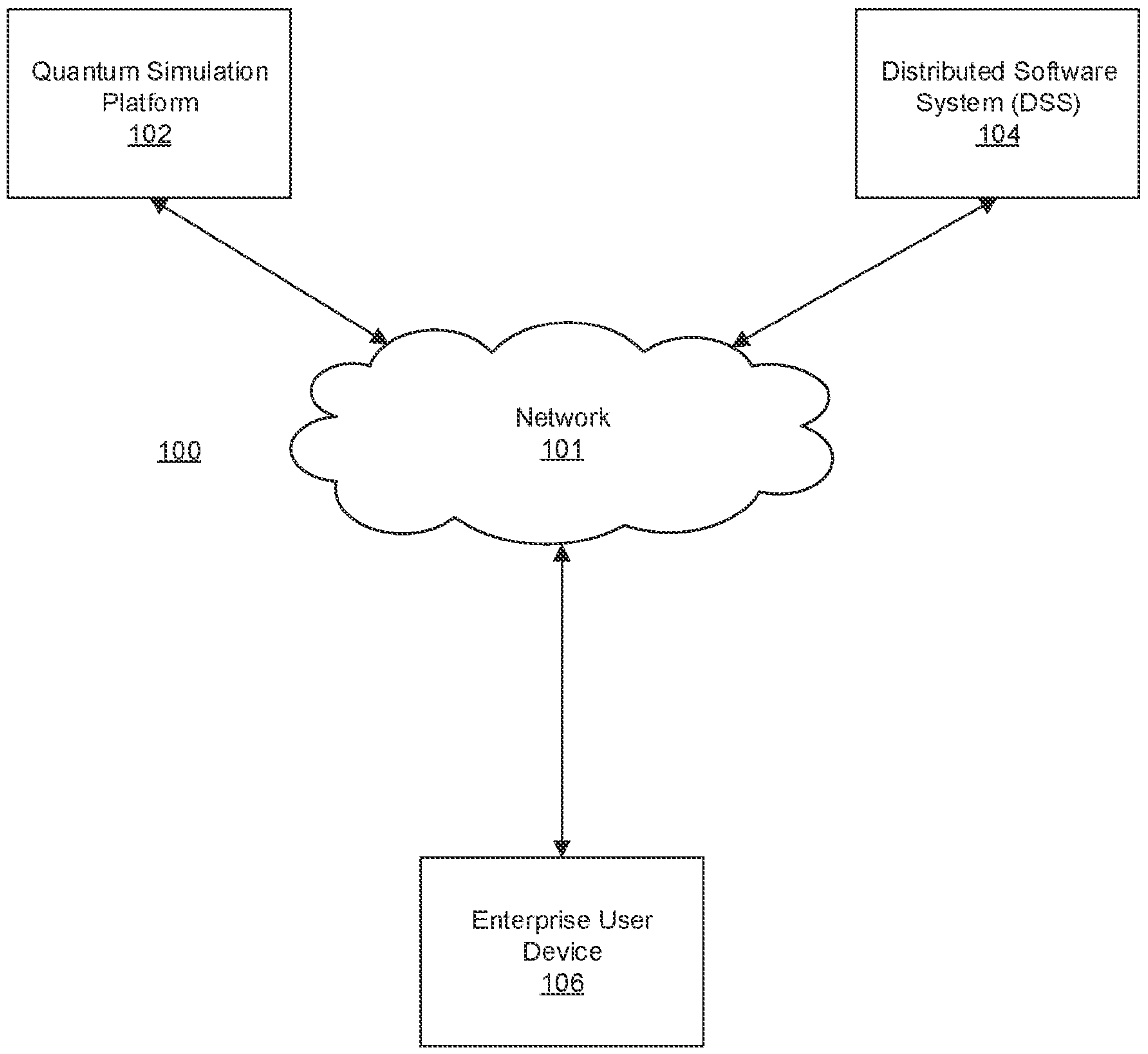
FIGS. 1A-1B depict an illustrative computing environment for strategizing distributed systems using quantum simulation in accordance with one or more example arrangements.

In the following description of various illustrative arrangements, reference is made to the accompanying drawings, which form a part hereof, and in which is shown, by way of illustration, various arrangements in which aspects of the disclosure may be practiced. In some instances, other arrangements may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief description of the concepts described further herein, some aspects of the disclosure relate to strategizing distributed systems using quantum simulation. Entities such as an enterprise organization (e.g., a financial institution, and/or other institutions) may utilize one or more systems to solve problems related to a business venture pursued by the entity. In some instances, enterprise organizations may utilize distributed software systems (DSS) to solve one or more problems. A DSS may be configured to manage multiple devices (e.g., computers, servers, databases, or the like) that run multiple processes in parallel to address different aspects of a problem. The DSS may distribute information related to solving the problem across various computer clusters of devices in various configurations. In some examples, enterprise organizations may desire to upgrade, modify, and/or otherwise optimize a DSS in order to improve its efficiency.

However, because the DSS involves a plurality of devices operating in different clusters with different information distributions, conventional methods of optimizing a DSS typically require a trial and error approach to modify and/or upgrade the DSS, because actions that affect one device or function of the DSS may subsequently impact one or more additional devices and/or functions. Such an approach is outdated and inefficient because it requires testing multiple configurations and/or approaches to modifying and/or upgrading the DSS without certainty of the outcome. Additionally, errors caused by testing modifications and/or upgrades on an active DSS may cause more damage than the underlying problem the optimization is intended to fix. For example, the trial and error approach may cause resource contention between one or more devices in the system, and/or may cause denial of service to one or more devices sharing the DSS infrastructure. Thus, there exists a need for a non-invasive method of optimizing DSS systems.

Accordingly, in some instances, entities such as an enterprise organization and/or other organizations/institutions may employ a distributed software system (DSS) optimization platform configured to enable validation and optimization of a DSS without introducing errors such as resource contention and denial of service. The DSS optimization platform may be configured to generate a digital twin of an active DSS and continuously sync the digital twin to the DSS. The DSS optimization platform may, in some examples, generate vectors showing the data distribution and/or the computer configuration of various devices included in the DSS and may, in some instances, represent the changes to the distributions and/or configurations over time. In some examples, the DSS optimization platform may generate encoded matrix representations of the vectors. In some instances, the DSS optimization platform may additionally (and, e.g., simultaneously or near-simultaneously) receive source code from a developer containing instructions for a potential modification to the DSS. The DSS optimization platform may parse the information into a directed acyclic graph (DAG) and subsequently generate an encoded matrix of the DAG. The DSS optimization platform may utilize the encoded matrices described above to simulate, using quantum simulation performed on the digital twin, the potential effects of the source code on the DSS. Based on the results of the quantum simulation, the DSS optimization platform may identify the optimal configuration/scenario for implementing the source code and subsequently commit, test, and deploy the source code based on the identification. Accordingly, the DSS optimization platform may determine the optimal method of modifying the DSS without the risks and resource expenditures associated with conventional trial and error methods.

Institutions may employ the methods of validating and optimizing a DSS using a DSS optimization platform described above via computing devices that utilize machine learning models (e.g., quantum neural networks, or the like). In some instances, a device such as a computing platform may train a plurality of machine learning models (e.g., a quantum simulator model, and/or other models). For example, in some instances, a quantum simulator model may be trained to generate, based on historical configuration information (e.g., data distributions, device clustering, or the like) scenario results indicating the likely effects of executing source code in different configurations of the DSS. The quantum simulation model approach and the methods described above may improve the efficiency and accuracy of optimizing a DSS by eliminating issues such as resource contention and denial of service introduced by manual trial and error methods of optimizing the DSS that are deployed in real-time production.

These and various other aspects will be discussed more fully herein.

Figure 1B:
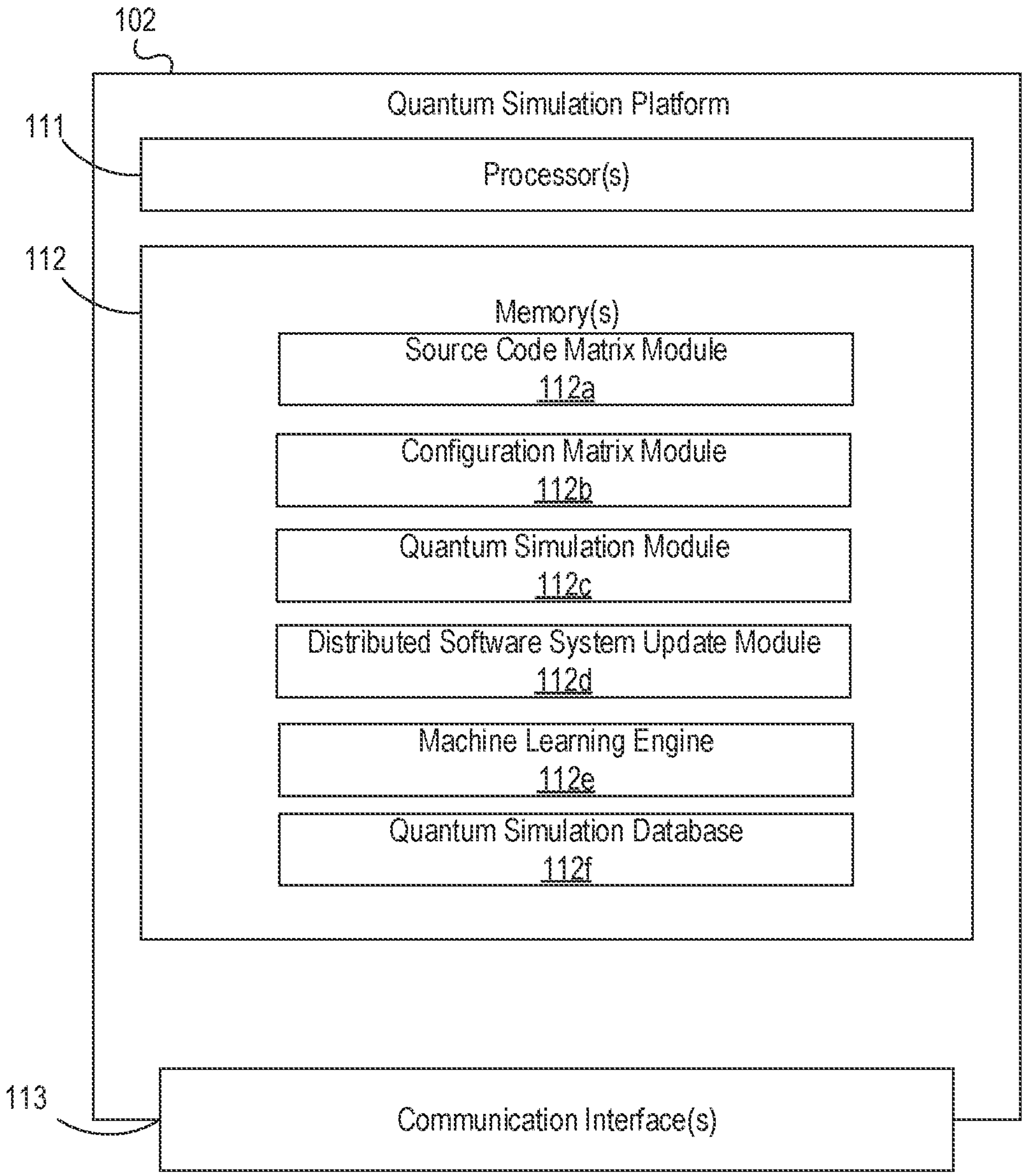

FIGS. 1A-1B depict an illustrative computing environment for strategizing distributed systems using quantum simulation in accordance with one or more example arrangements. Referring to FIG. 1A, computing environment 100 may include one or more computer systems. For example, computing environment 100 may include quantum simulation platform 102, a distributed software system (DSS) 104, and an enterprise user device 106.

As described further below, quantum simulation platform 102 may be a computer system that includes one or more computing devices (e.g., servers, laptop computer, desktop computer, mobile device, tablet, smartphone, and/or other devices) and/or other computer components (e.g., processors, memories, communication interfaces) that may be used to configure, train, and/or execute one or more machine learning models (e.g., a quantum simulation model (QSM), an encoding model, and/or other models). For example, the quantum simulation platform 102 may train the one or more machine learning models to generate encoded vectors based on input of directed acyclic graphs (DAGs) and/or to generate execution scenarios and optimization scores based on input of source code matrices and configuration matrices. In some instances, the one or more computing devices and/or other computer components may be used to receive source code and/or requests from one or more computing device (e.g., DSS 104, enterprise user device 106, and/or other computing device). In one or more instances, the quantum simulation platform 102 may be configured to communicate with one or more systems (e.g., DSS 104, enterprise user device 106, and/or other systems) to perform an information transfer, display an interface, generate a digital twin, monitor a DSS, and/or perform other functions.

The DSS 104 may be and/or otherwise include one or more computing devices (e.g., servers, server blades, and/or other devices) and/or other computer components (e.g., processors, memories, communication interfaces) that may be used to perform a variety of functions. For example, the DSS 104 may be and/or otherwise include one or more computing devices configured to execute one or more applications (e.g., computer programs, or the like) to perform functions such as processing event processing requests, communicating between one or more additional DSSs, and/or other functions. Additionally or alternatively, in some instances, the DSS 104 may be and/or include a plurality of computing devices organized in one or more configurations for performing the variety of functions. For example, the plurality of devices may be configured in a plurality of clusters, where each cluster may be dedicated to one or more particular functions. In one or more instances, the DSS 104 may be configured to communicate with one or more systems (e.g., quantum simulation platform 102, enterprise user device 106, and/or other systems) to receive an update, generate a digital twin, and/or to perform other functions.

The enterprise user device 106 may be a computing device (e.g., laptop computer, desktop computer, mobile device, tablet, smartphone, server, server blade, and/or other device) and/or other data storing or computing component (e.g., processors, memories, communication interfaces, databases) that may be used to transfer information between devices and/or perform other user functions (e.g., sending user information, sending interaction opportunities, sending incident reports, and/or other functions). In one or more instances, enterprise user device 106 may correspond to a first entity (e.g., an enterprise organization, such as a financial institution and/or other institution). For example, the enterprise user device 106 may be a developer desk corresponding to a source code developer who may, e.g., be an employee of the first entity. In one or more instances, the enterprise user device 106 may be configured to communicate with one or more systems (e.g., quantum simulation platform 102, DSS 104, and/or other systems) to perform a data transfer, send source code, update a DSS, and/or to perform other functions. In some instances, the enterprise user device 106 may be configured to display one or more graphical user interfaces (e.g., DSS update alert interfaces, and/or other interfaces).

Although only one user/enterprise device is depicted herein, any number of such systems may be used to implement the methods described herein without departing from the scope of the disclosure.

Computing environment 100 also may include one or more networks, which may interconnect quantum simulation platform 102. DSS 104, and enterprise user device 106. For example, computing environment 100 may include a network 101 (which may interconnect, e.g., quantum simulation platform 102. DSS 104, and enterprise user device 106).

In one or more arrangements, quantum simulation platform 102, DSS 104, and enterprise user device 106 may be any type of computing device capable of sending and/or receiving requests and processing the requests accordingly. For example, quantum simulation platform 102, DSS 104, enterprise user device 106, and/or the other systems included in computing environment 100 may, in some instances, be and/or include server computers, desktop computers, laptop computers, tablet computers, or the like that may include one or more processors, memories, communication interfaces, storage devices, and/or other components. As noted above, and as illustrated in greater detail below, any and/or all of quantum simulation platform 102, DSS 104, and enterprise user device 106, may, in some instances, be special-purpose computing devices configured to perform specific functions.

Referring to FIG. 1B, quantum simulation platform 102 may include one or more processors 111, memory 112, and communication interface 113. A data bus may interconnect processor 111, memory 112, and communication interface 113. Communication interface 113 may be a network interface configured to support communication between quantum simulation platform 102 and one or more networks (e.g., network 101, or the like). Communication interface 113 may be communicatively coupled to the processor 111. Memory 112 may include one or more program modules having instructions that, when executed by processor 111, cause quantum simulation platform 102 to perform one or more functions described herein and/or one or more databases (e.g., a quantum simulation database **112*f*, or the like) that may store and/or otherwise maintain information which may be used by such program modules and/or processor 111. In some instances, the one or more program modules and/or databases may be stored by and/or maintained in different memory units of quantum simulation platform 102 and/or by different computing devices that may form and/or otherwise make up quantum simulation platform 102. For example, memory 112 may have, host, store, and/or include a source code matrix module 112***a*, a configuration matrix module 112*b*, a quantum simulation module 112*c*, a distributed software system update module 112*d*, a machine learning engine 112*e*, a quantum simulation database 112*f*, and/or other modules and/or databases.

Source code matrix module 112*a* may have instructions that direct and/or cause quantum simulation platform 102 to receive source code, generate DAGs, generate encoded vectors, generate distribution assessments, generate source code matrices, and/or perform other functions. Configuration matrix module 112*b* may have instructions that direct and/or cause quantum simulation platform 102 to generate a digital twin, generate change vectors, generate configuration matrices, and/or perform other functions. Quantum simulation module 112*c* may have instructions that direct and/or cause quantum simulation platform 102 to generate execution scenarios, generate optimization scores, and/or perform other functions. Distributed software system update module 112*d* may have instructions that direct and/or cause quantum simulation platform 102 to monitor a DSS, compare optimization scores with threshold scores, generate decoded representations, cause updates to a DSS, and/or perform other functions. Machine learning engine 112*e* may contain instructions directing and/or causing the quantum simulation platform 102 to train, implement, and/or update one or more machine learning models, such as an encoding model (that may, e.g., be used to generate encoded vectors, and/or perform other functions), a QSM model (that may, e.g., be used to generate optimization scores, generate execution scenarios, and/or perform other functions) and/or other models. In some instances, machine learning engine 112*e* may be used by quantum simulation platform 102 to refine and/or otherwise update methods for strategizing distributed systems using quantum simulation, and/or other methods described herein. Quantum simulation database 112*f* may have instructions causing quantum simulation platform 102 to store source code, digital twins, change vectors, encoded vectors, and/or other information.

Although source code matrix module 112*a*, configuration matrix module 112*b*, quantum simulation module 112*c*, distributed software system update module 112*d*, machine learning engine 112*e*, and quantum simulation database 112*f* are depicted as separate modules herein, the instructions stored by these modules may be stored in any number of modules without departing from the scope of this disclosure.

Figure 2A:
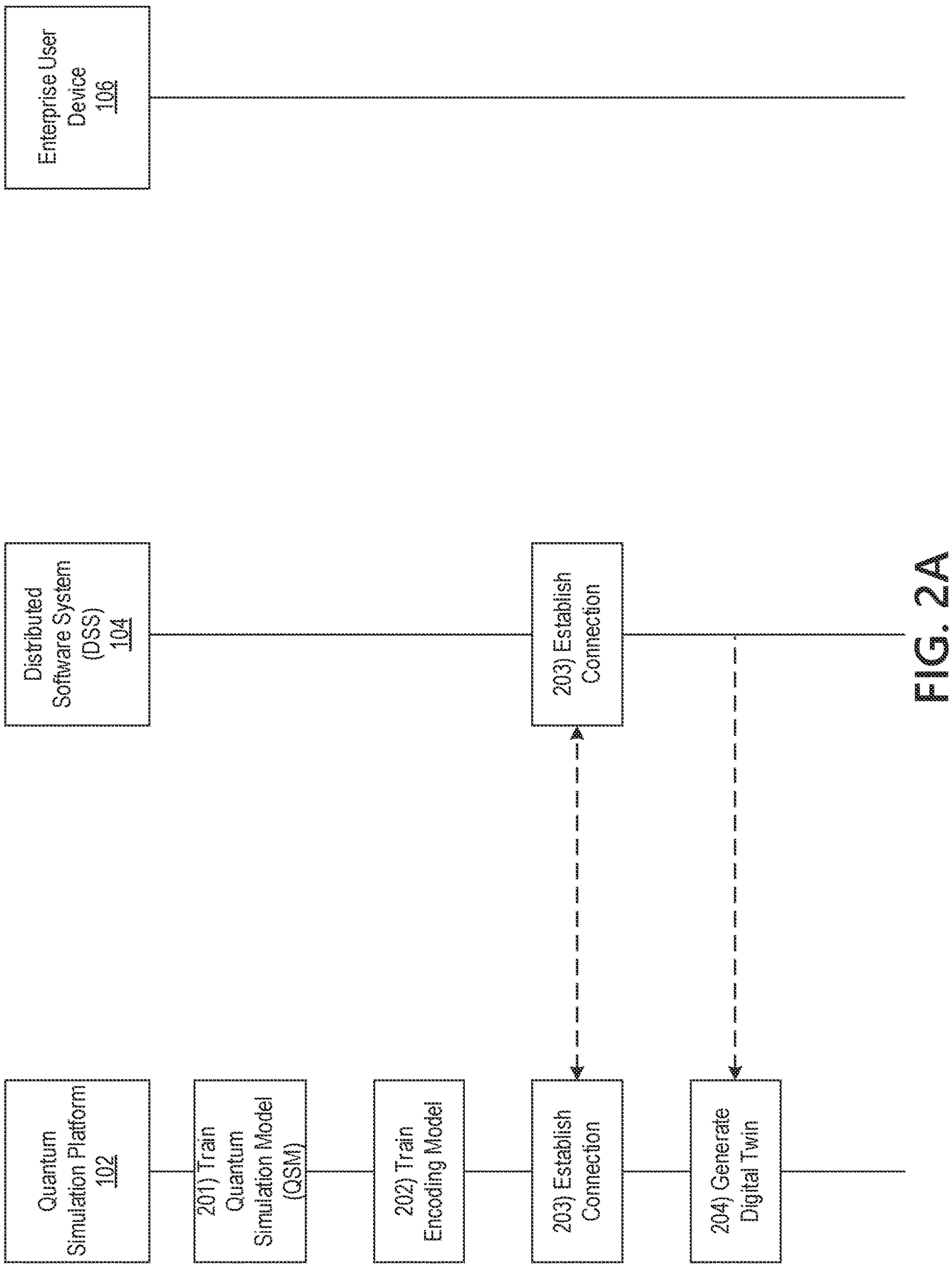
FIGS. 2A-2E depict an illustrative event sequence for strategizing distributed systems using quantum simulation in accordance with one or more example arrangements.

FIGS. 2A-2E depict an illustrative event sequence for strategizing distributed systems using quantum simulation in accordance with one or more example arrangements. Referring to FIG. 2A, at step 201, the quantum simulation platform 102 may train a quantum simulation model (QSM). For example, the quantum simulation platform 102 may train the QSM to output optimization scores for execution scenarios based on input of source code matrices (e.g., matrices including a plurality of rows and columns representing configurations and/or schedules for executing source code, and/or other similar matrices) and input of configuration matrices (e.g., matrices including a plurality of rows and columns representing device configurations and/or data distributions in a DSS, and/or similar matrices). In some instances, the quantum simulation platform 102 may configure and/or otherwise train the QSM based on training information, such as historical execution scenarios (e.g., historical configurations and/or schedules for executing one or more functions included in source code) and corresponding historical optimization scores for the historical execution scenarios (e.g., integer values, percentages, decimal values, or the like). In some instances, to configure and/or otherwise train the QSM, the quantum simulation platform 102 may process one or more historical execution scenarios and/or historical optimization scores by applying natural language processing, natural language understanding, supervised machine learning techniques (e.g., regression, classification, neural networks, support vector machines, random forest models, naïve Bayesian models, and/or other supervised techniques), unsupervised machine learning techniques (e.g., principal component analysis, hierarchical clustering, K-means clustering, and/or other unsupervised techniques), and/or other techniques. In doing so, the quantum simulation platform 102 may train the QSM to generate execution scenarios and corresponding optimization scores based on input of source code matrices and configuration matrices.

For example, in configuring and/or otherwise training the QSM, the quantum simulation platform 102 may identify one or more correlations between the historical execution scenarios and the corresponding historical optimization scores. For instance, the quantum simulation platform 102 may identify that a first historical execution scenario is and/or includes a process for executing a particular function (e.g., adding, removing, or modifying an application of a DSS, adding, removing, or modifying a device included in a DSS, and/or other functions), where the process includes three steps. The quantum simulation platform 102 may identify that a first historical optimization score corresponding to the first historical execution scenario is and/or incorporates a value (e.g., an integer, a percentage, a decimal, or the like) based on the process including three steps. For example, the quantum simulation platform 102 may identify that the first historical optimization score is 50, and that 20% of the first historical optimization score is attributed to the fact that the process includes three steps. Accordingly, the quantum simulation platform 102 may train the QSM based on the correlation between a process including three steps and a value providing 20% of the optimization score. In one or more examples, the quantum simulation platform 102 may additionally or alternatively identify correlations between multiple historical execution scenarios and multiple historical optimization scores.

Consider an example where a first historical execution scenario and a second historical execution scenario correspond to a first historical optimization score and a second historical optimization score, respectively. The quantum simulation platform 102 may identify that the first historical execution scenario requires 30 megabytes (mb) of storage space to be executed, while the second historical execution scenario requires 20 mb of storage space to be executed. The quantum simulation platform 102 may, in some instances, identify that the first historical optimization score is and/or includes a value of 50, while the second historical optimization score is and/or includes a value of 70. Based on these identifications, the quantum simulation platform 102 may train the QSM based on a correlation indicating that, in a comparison between two execution scenarios, the execution scenario that requires a greater amount of storage space should receive a lower optimization score than the execution scenario that requires a lesser amount of storage space.

Additionally or alternatively, in some instances, in training the QSM the quantum simulation platform 102 may train the QSM to generate execution scenarios, prior to generating the corresponding optimization scores, based on input of source code matrices and configuration matrices. For example, the quantum simulation platform 102 may, using some or all of the historical execution scenarios, identify one or more correlations between the historical execution scenarios and one or more matrices that were used to generate the historical execution scenarios. For instance, the quantum simulation platform 102 may identify that a historical execution scenario that is and/or includes three steps for executing a particular function was generated based on a source code matrix that includes a particular number of rows and a particular number of columns of information associated with the particular function. Accordingly, the quantum simulation platform 102 may train the QSM to generate future execution scenarios that also include three steps for executing the particular function, based on input of a source code matrix that includes the same particular number of rows and the same particular number of columns of information associated with the particular function.

It should be understood that the above description merely represents examples of how the QSM may be trained to generate execution scenarios and/or optimization scores, and in one or more additional examples further methods of training the QSM may be utilized by the quantum simulation platform 102.

At step 202 the quantum simulation platform 102 may train an encoding model. For example, the quantum simulation platform 102 may train the encoding model as a neural network configured to output encoded vectors based on input of directed acyclic graphs (DAGs) (e.g., graphs including pluralities of nodes and pluralities of edges representing a series of functions and/or applications which may, e.g., correspond to source code). In some instances, the quantum simulation platform 102 may configure and/or otherwise train the encoding model based on a training set of information, such as historical DAGs. In some instances, to configure and/or otherwise train the encoding model, the quantum simulation platform 102 may process one or more historical DAGs by applying natural language processing, natural language understanding, supervised machine learning techniques (e.g., regression, classification, neural networks, support vector machines, random forest models, naïve Bayesian models, and/or other supervised techniques), unsupervised machine learning techniques (e.g., principal component analysis, hierarchical clustering, K-means clustering, and/or other unsupervised techniques), and/or other techniques. In doing so, the quantum simulation platform 102 may train the encoding model to generate encoded vectors based on input of DAGs.

For example, in configuring and/or otherwise training the encoding model, the quantum simulation platform 102 may identify one or more correlations to the historical DAGs. In identifying the one or more correlations, the quantum simulation platform 102 identify similarities in information included in the historical DAGs (e.g., particular functions and/or applications associated with snippets of source code, and/or other information included in source code associated with the historical DAGs). Based on the identified similarities, the quantum simulation platform 102 may train the encoding model to store a correlation between similar information and/or types of information for use in generating future encoded vectors. For example, based on identifying two nodes in a historical DAG that are both associated with performing the same function, the quantum simulation platform 102 may train the encoding model to store a correlation between the two nodes that may, e.g., be used to generate encoded vectors. Based on storing one or more identified correlations, the quantum simulation platform 102 may train the encoding model as a variational auto-encoder configured to map information included in the historical DAGs to latent spaces of an encoded vector such that similar information is grouped together. For example, the quantum simulation platform 102 may train the encoding model to map information included in nodes that correspond to a first function to a latent space (e.g., an embedding) such that the encoding model will, based on subsequent input of DAGs, generate encoded vectors that group information included in nodes corresponding to the first function to the same encoded vector.

It should be understood that the above description merely represents examples of how the encoding model may be trained to generate encoded vectors, and in one or more additional examples further methods of training the encoding model may be utilized by the quantum simulation platform 102.

At step 203, the quantum simulation platform 102 may establish a connection with the DSS 104. For example, the quantum simulation platform 102 may establish a first wireless data connection with the DSS 104 to link the DSS 104 with the quantum simulation platform 102 (e.g., in preparation for generating a digital twin of the DSS 104, monitoring the DSS 104, and/or other functions). In some instances, the quantum simulation platform 102 may identify whether or not a connection is already established with the DSS 104. If a connection is already established with the DSS 104, the quantum simulation platform 102 might not re-establish the connection. If a connection is not yet established with the DSS 104, the quantum simulation platform 102 may establish the first wireless data connection as described above.

At step 204, the quantum simulation platform 102 may generate a digital twin of a DSS. For example, the quantum simulation platform 102 may generate a digital twin of the DSS 104. In generating the digital twin, the quantum simulation platform 102 may scan, parse, and/or otherwise analyze the DSS 104 via the communication interface 113 and while the first wireless data connection is established. In analyzing the DSS 104, the quantum simulation platform 102 may identify one or more devices (e.g., computers, smart devices, mobile phones, or the like) and/or one or more applications (e.g., computer programs, or the like) included in the DSS 104. Additionally, the quantum simulation platform 102 may identify attributes of the DSS (e.g., a number of devices included in the DSS, an amount of central processing unit (CPU) usage associated with the DSS, an amount of random access memory (RAM) usage associated with the DSS, data distributions associated with one or more devices included in the DSS, and/or other attributes of the DSS). Based on the identified one or more devices and/or applications and based on the identified attributes, the quantum simulation platform 102 may generate the digital twin as a virtual representation of the one or more devices and/or one or more applications of the DSS. The digital twin may include the one or more identified attributes of the DSS. In some instances, during and/or in response to generating the digital twin, the quantum simulation platform 102 may store the digital twin to memory (e.g., internal memory, such as memory 112, and/or external memory).

Figure 2B:
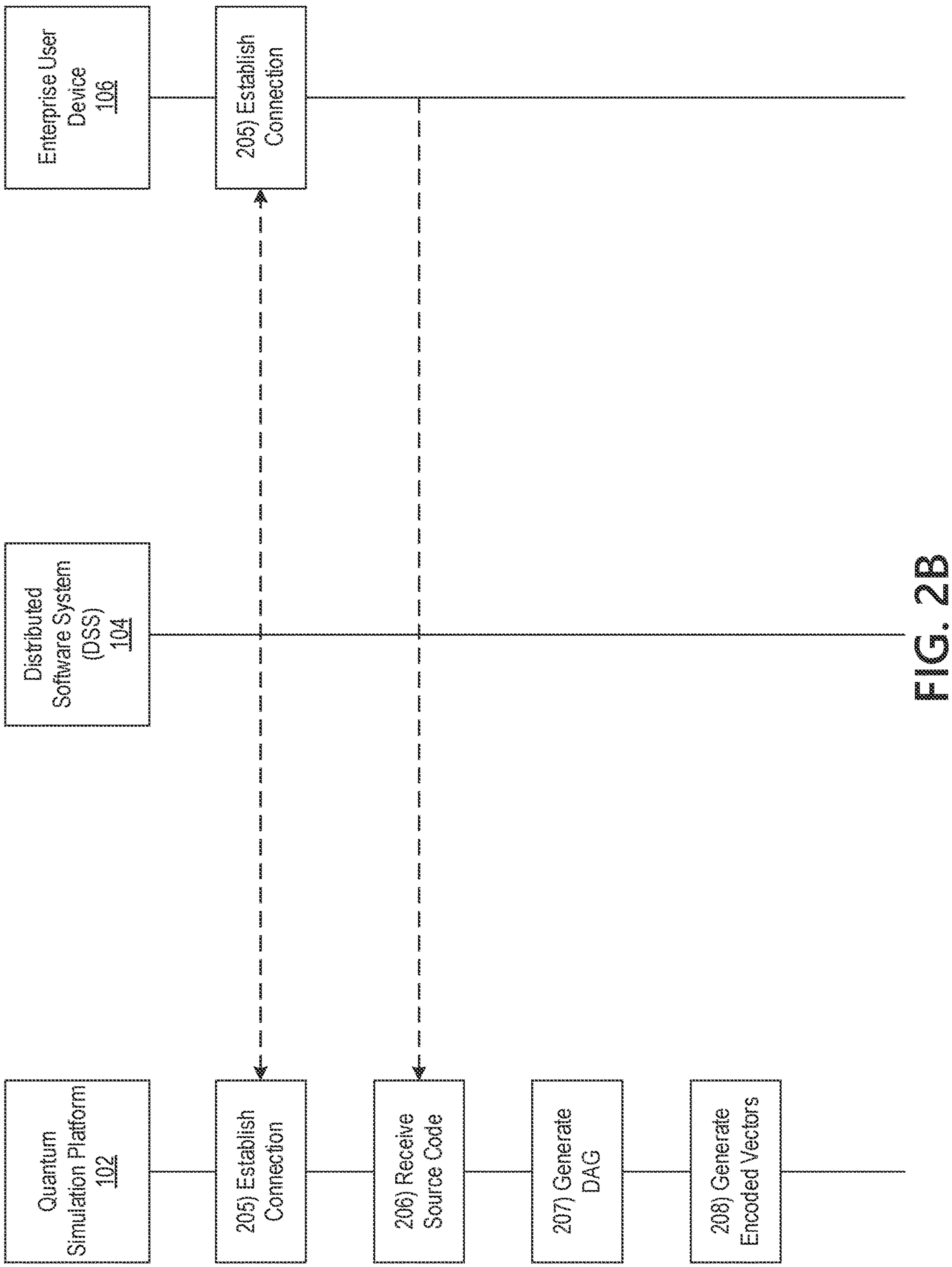

Referring to FIG. 2B, at step 205, the quantum simulation platform 102 may establish a connection with the enterprise user device 106. For example, the quantum simulation platform 102 may establish a second wireless data connection with the enterprise user device 106 to link the enterprise user device 106 with the quantum simulation platform 102 (e.g., in preparation for receiving source code, causing updates to a DSS (e.g., DSS 104, or the like), and/or other functions). In some instances, the quantum simulation platform 102 may identify whether or not a connection is already established with the enterprise user device 106. If a connection is already established with the enterprise user device 106, the quantum simulation platform 102 might not re-establish the connection. If a connection is not yet established with the enterprise user device 106, the quantum simulation platform 102 may establish the second wireless data connection as described above.

At step 206, the quantum simulation platform 102 may receive source code. In some instances, the quantum simulation platform 102 may receive source code from an enterprise user device (e.g., the enterprise user device 106, or the like). For example, the quantum simulation platform 102 may receive the source code from the enterprise user device 106 via the communication interface 113 and while the second wireless data connection is established. In some instances, the source code may be and/or include code for installing and/or executing one or more functions and/or applications, on and/or via one or more computing devices included in the DSS. For example, the source code may be and/or include code representing a plurality of computer programs and/or modules configured to add functions and/or applications to the DSS in order to improve and/or achieve performance of one or more operations (e.g., processing event processing requests, and/or other operations).

At step 207, based on or in response to receiving the source code, the quantum simulation platform 102 may generate a DAG for the source code. In generating the DAG, the quantum simulation platform 102 may parse and/or otherwise inspect the source code to identify one or more functions and/or applications included in the source code. For example, the quantum simulation platform 102 may parse the source code and identify that the source code includes one or more program modules, each configured to perform a particular operation when the source code is executed. Based on parsing the source code, the quantum simulation platform 102 may generate a DAG including a plurality of nodes and a plurality of edges. Each node may be and/or include a subset of the source code corresponding to a particular function, and each edge may be and/or include a correlation between functions included in the source code. For example, consider a scenario where the source code includes four subsets of code, each corresponding to one of functions "A," "B," "C," and "D". In such a scenario, the source code may also include one or more correlations between the functions A, B, C, and D. For example, the source code may include correlations indicating that function A is performed first, then function B or function C is performed second, and function D is performed third, in order to execute a particular operation (e.g., routing an event processing request, and/or other operations performed by the DSS). Based on the above scenario, the quantum simulation platform 102 may generate a DAG that represents the series of steps described above. For example, the quantum simulation platform 102 may generate a DAG similar to DAG 500, as illustrated in FIG. 5.

Figure 5:
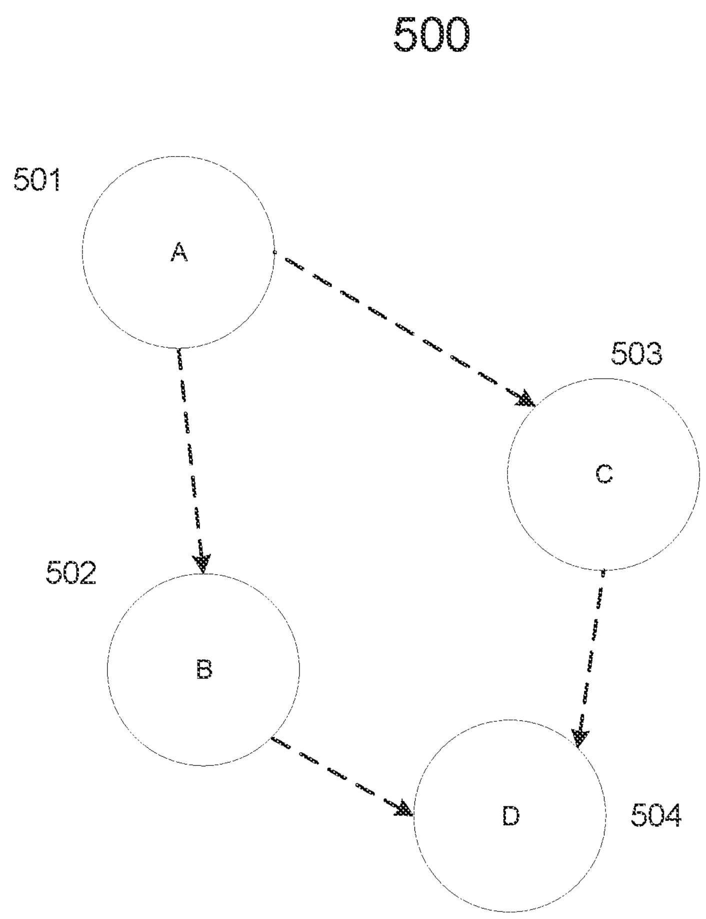
FIG. 5 depicts an illustrative directed acyclic graph (DAG) for strategizing distributed systems using quantum simulation in accordance with one or more example arrangements.

Referring to FIG. 5, DAG 500 may include a first node 501 representing the code associated with function A and connected to two edges: one edge going from the first node 501 to a second node 502 associated with function B, and another edge going from the first node 501 to a third node 503 associated with function C. The second node 502 and the third node 503 may each be connected to an additional respective edge going from the second/third node 502/503 to a fourth node 504 associated with function D.

Referring back to FIG. 2B, at step 208, the quantum simulation platform 102 may generate one or more encoded vectors based on the DAG. In generating the one or more encoded vectors, the quantum simulation platform 102 may input the DAG into the encoding model. Based on inputting the DAG into the encoding model, the quantum simulation platform 102 may cause the encoding model to generate one or more encoded vectors for each node of the DAG. For instance, the encoding model may generate an encoded vector for each variation of the function associated with each node of the DAG. Consider an example similar to the example above at step 207, where the DAG includes four nodes A, B, C, and D, and each node corresponds to a particular function included in the source code. The source code for the function corresponding to node A may, in some examples, be and/or include a plurality of variations for performing the function corresponding to node A. For example, the source code may be and/or include a first set of instructions for performing the function using a first group of devices (which may, e.g., be included in the DSS) and a second set of instructions for performing the function using a second group of devices (which may, e.g., also be included in the DSS). Accordingly, in these examples, the quantum simulation platform 102 may cause the encoding model to generate two encoded vectors for node A, one for each variation of the function associated with node A.

In some examples, in generating the one or more encoded vectors, the quantum simulation platform 102 may cause the encoding model to use one or more stored correlations generated while training the encoding model (e.g., as described above at step 202). In so doing, the quantum simulation platform 102 may cause the encoding model to generate the one or more encoded vectors by mapping each variation of a function corresponding to a node of the DAG to a latent space (e.g., by embedding the code to a position in a vector) such that similar functions are mapped to similar spaces. For instance, the encoding model may have stored correlations between a plurality of nodes for performing a first function, based on one or more historical DAGs (e.g., as described above at step 202). The stored correlations may indicate an association between variations of code for performing the first function. Based on detecting, in the DAG generated at step 207, a plurality of nodes representing variations of code for performing the first function, the encoding model may generate an encoded vector for each variation of the code for performing the first function by mapping similar portions of the code to the same position in the respective encoded vector. For example, the DAG may include two nodes, "X" and "Y". Node X and node Y may each include code for performing two variations of a particular function, equating to a total of four variations. The code for performing each variation of the particular function may include at least one subset of code corresponding to a stored correlation maintained by the encoding model. Accordingly, the encoding model may generate four encoded vectors (one for each variation), where each encoded vector maps the at least one subset of code to the same position in the respective encoded vector, based on the stored correlation.

Figure 2C:
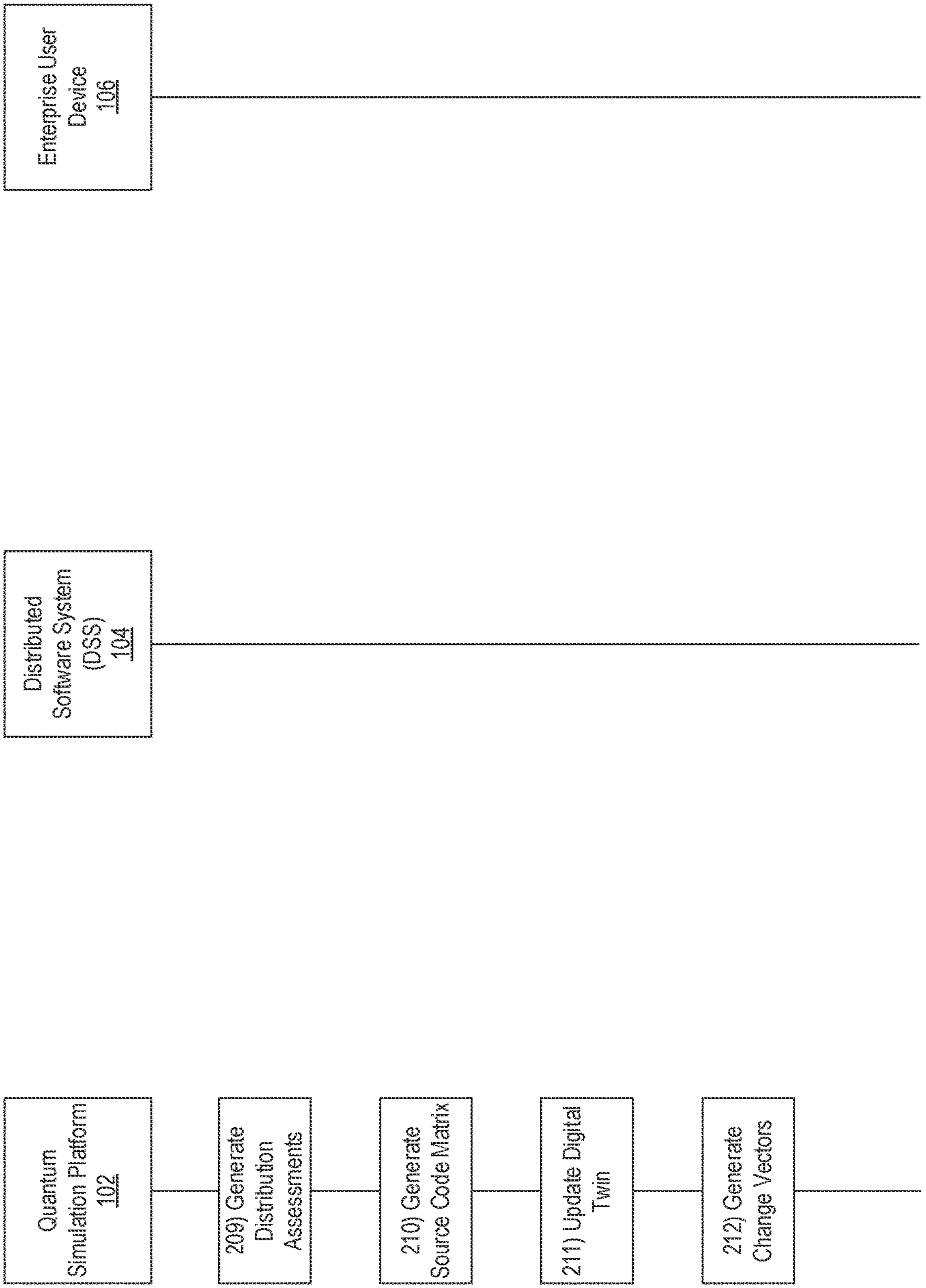

Referring to FIG. 2C, at step 209, the quantum simulation platform 102 may generate a plurality of distribution assessments. Each distribution assessment may represent a potential organization of a plurality of encoded vectors. For example, a given distribution assessment may represent a potential method of performing a particular operation (e.g., processing an event processing request, performing a data transfer, and/or other operations performed by devices in the DSS) by, e.g., executing a series of functions and/or applications associated with encoding vectors generated by the quantum simulation platform 102 (e.g., as described above at step 208). In generating the plurality of distribution assessments, the quantum simulation platform 102 may generate a unique distribution assessment for each potential organization of the encoding vectors.

Consider a scenario where the quantum simulation platform 102 generated twelve encoded vectors (e.g., using the methods described above at steps 207-208): four encoded vectors for performing a function "A," four encoded vectors for performing a function "B," and four encoded vectors for performing a function "C," A operation "X" may be performed by executing functions A, B, and C in series. Accordingly, based on the twelve encoded vectors described above, the quantum simulation platform 102 may generate a plurality of distribution assessments such that a unique distribution assessment is generated for each possible combination of: (1) an encoded vector for performing function A, (2) an encoded vector for performing function B, and (3) an encoded vector for performing function C. The distribution assessments may be and/or include electronic files, computer code, and/or other digital representations of the logic of the distribution assessments.

At step 210, based on or in response to generating the plurality of distribution assessments, the quantum simulation platform 102 may generate a source code matrix (e.g., a source code matrix for the source code received at step 206, or the like). In generating the source code matrix, the quantum simulation platform 102 may generate a source code matrix that is and/or includes information of the plurality of distribution assessments. For example, the source code matrix may be and/or include a digital matrix of rows and columns, where positions of the rows and columns are mapped to information of the distribution assessments. Accordingly, the rows and columns of the source code matrix may represent the potential organizations of the encoded vectors (and, therefore, the source code represented by the encoded vectors) included in the distribution assessments. In generating the source code matrix as described above, the quantum simulation platform 102 may generate a matrix that, through the encoded vectors and the corresponding distribution assessments, represents the potential organizations of functions included in the source code. Accordingly, using the functions described above at steps 206-210, the quantum simulation platform 102 may effectively convert the source code into a format configured to be analyzed by a QSM.

At step 211, the quantum simulation platform 102 may update the digital twin. In some examples, the quantum simulation platform 102 may update the digital twin based on monitoring the DSS. For example, the quantum simulation platform 102 may monitor the DSS for any configuration changes (e.g., modifications to the devices included in the DSS, modifications to the data distribution clusters within the DSS, and/or other changes) via the communication interface 113 and while the first wireless data connection is established. Based on monitoring the DSS, the quantum simulation platform 102 may identify one or more configuration changes to the DSS. Based on identifying the one or more configuration changes, the quantum simulation platform 102 may update the digital twin to reflect the current state of the DSS. For example, the quantum simulation platform 102 may electronically modify the digital twin such that the digital twin incorporates the one or more identified configuration changes. In this way, the quantum simulation platform 102 may ensure that the digital twin remains an accurate representation of the DSS. In some examples, the quantum simulation platform 102 may continuously or periodically perform the functions described above to update the digital twin. Accordingly, the quantum simulation platform 102 may ensure that the digital twin continuously or periodically remains synchronized with the DSS.

At step 212, the quantum simulation platform 102 may generate a plurality of change vectors. For example, the quantum simulation platform 102 may generate a plurality of change vectors corresponding to the digital twin. In some instances, the change vectors may be and/or include information useful for applying updates to the DSS. For instance, in some examples, each change vector of the plurality of change vectors may be and/or include configuration information corresponding to the digital twin. In some examples, the configuration information corresponding to the digital twin may be and/or include data distributions for the plurality of devices included in the DSS. For instance, the configuration information may include indications of an amount of data utilized by each device in the DSS, indications of an amount of CPU usage associated with each device in the DSS, indications of an amount of RAM usage associated with each device in the DSS, and/or other data distributions. Additionally or alternatively, in some instances, the configuration information may be and/or include one or more clusters of information corresponding to one or more applications included in the DSS. For example, the configuration information may include indicators of an amount of information corresponding to a given application, indicators of a type of information corresponding to a given application, indicators of sources of data clusters for a given application, and/or other clusters of information.

Figure 2D:
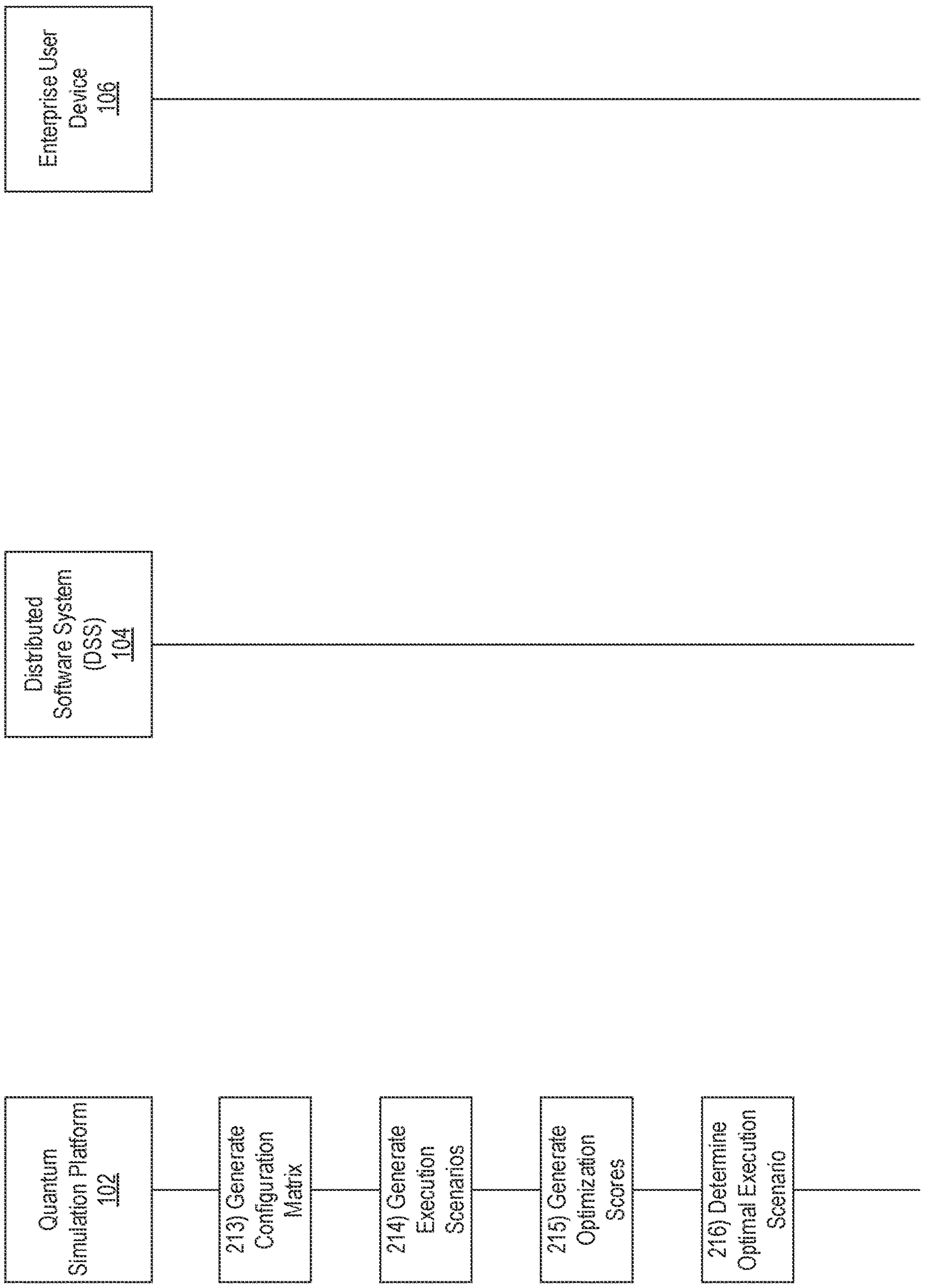

Referring to FIG. 2D, at step 213, based on or in response to generating the plurality of change vectors, the quantum simulation platform 102 may generate a configuration matrix. For example, the quantum simulation platform 102 may generate a configuration matrix that includes information of the plurality of change vectors. In some examples, the quantum simulation platform 102 may generate a configuration matrix that is and/or includes a plurality of rows and a plurality of columns that cumulatively represent all of the information included in the plurality of change vectors.

Though listed as sequential steps, it should be understood that, in some instances, steps 205-210 and steps 211-213 may, in some instances, occur simultaneously or near-simultaneously.

At step 214, the quantum simulation platform 102 may generate a plurality of execution scenarios. For example, the quantum simulation platform 102 may generate a plurality of execution scenarios for executing the source code received at step 206, using the QSM trained at step 201. In some examples, the quantum simulation platform 102 may generate the plurality of execution scenarios by inputting the source code matrix and the configuration matrix into the QSM. In generating the plurality of execution scenarios, based on inputting the source code matrix and the configuration matrix into the QSM, the quantum simulation platform 102 may utilize a plurality of historical execution scenarios used to train the QSM (e.g., as described above at step 201). For example, the quantum simulation platform 102 may use the QSM to identify one or more correlations between the source code matrix on the plurality of historical execution scenarios. In some instances, the quantum simulation platform 102 may identify the one or more correlations by using the QSM to compare the source code matrix to the plurality of historical execution scenarios used to train the QSM. For example, the quantum simulation platform 102 may, by comparing the source code matrix to the plurality of historical execution scenarios, determine that the source code matrix includes a particular number of rows and a particular number of columns of information associated with performing a particular function and that one or more historical execution scenarios each include three steps for performing the particular function (e.g., using one or more devices of the DSS in a particular order, using one or more applications of the DSS in a particular order, and/or other steps). Based on the comparing, the quantum simulation platform 102 may identify one or more correlations between the source code and the one or more historical execution scenarios. For example, the quantum simulation platform 102 may have previously caused the QSM to store a correlation indicating that, based on source code matrices that include the same particular number of rows and the same particular number of columns associated with the same particular function, the QSM should generate an execution scenario that includes the same three steps.

Additionally, in some instances, in generating the plurality of execution scenarios, the quantum simulation platform 102 may utilize the configuration matrix and/or the information of the plurality of distribution assessments included in the configuration matrix to generate one or more execution scenarios for each variation of each function included in the source code. Specifically, the quantum simulation platform 102 may cause the QSM to determine execution scenarios for executing variations of each function included in the source code, represented by the source code matrix, using the DSS. For example, for each distribution assessment corresponding to information included in the source code matrix, the QSM may generate an execution scenario representing and/or including instructions for executing the source code on the DSS, based on the configuration information, of the digital twin, included in the configuration matrix. Consider an example situation where the source code matrix includes information of a distribution assessment that represents a method of executing an operation by performing three functions, "A," "B," and "C". As described above at step 209, such a distribution assessment may be and/or include (1) an encoded vector for performing function A, (2) an encoded vector for performing function B, and (3) an encoded vector for performing function C. Based on the configuration information (which may, e.g., be based on the digital twin) of the DSS included in the configuration matrix, the quantum simulation platform 102 may generate an execution scenario for performing functions A, B, and C using the DSS. For example, the quantum simulation platform 102 may generate an execution scenario (e.g., a set of instructions, or the like) where a first device included in the DSS is used to perform function A, a second device is used to perform function B, and a third device is used to perform function C.

At step 215, based on or in response to generating the plurality of execution scenarios the quantum simulation platform 102 may generate a plurality of optimization scores corresponding to the plurality of execution scenarios. For example, the quantum simulation platform 102 may generate a plurality of optimization scores using the QSM trained at step 201. Each optimization score of the plurality of optimization scores may correspond to an amount of resources (e.g., time, bandwidth, RAM, CPU usage, and/or other resources) associated with performing a particular execution scenario. In some examples, the quantum simulation platform 102 may generate the plurality of optimization scores based on inputting the source code matrix and the configuration matrix into the QSM (e.g., as described above at step 214). In some instances, in generating the plurality of optimization scores, based on inputting the configuration matrix and the source code matrix into the QSM, the quantum simulation platform 102 may utilize the historical optimization scores used to train the QSM. For example, the quantum simulation platform 102 may use the QSM to identify whether each execution scenario, of the plurality of execution scenarios, is similar to one or more historical execution scenarios corresponding to the historical optimization scores. Based on identifying a historical execution scenario that is similar to a given execution scenario, of the plurality of execution scenarios, the quantum simulation platform 102 may cause the QSM to generate an optimization score for the given execution scenario based on the historical optimization score corresponding to the historical execution scenario.

For example, the quantum simulation platform 102 may cause the QSM to identify whether a given execution scenario is similar to a historical execution scenario by comparing the execution scenario to the historical execution scenario and generating a similarity score. The similarity score may be based on a number and/or percentage of steps, instructions, or the like included in the execution scenario are also included in the historical execution scenario. For instance, based on comparing the execution scenario to a historical execution scenario, the QSM may identify that both scenarios include five steps, and that three of the steps are identical in both scenarios. Accordingly, the QSM may generate a similarity score for the execution scenario indicating it is 60% similar to the historical execution scenario.

Based on the similarity score between an execution scenario and a historical execution scenario, the quantum simulation platform 102 may cause the QSM to generate an optimization score for the execution scenario based on the historical optimization score corresponding to the historical execution scenario. In some examples, the quantum simulation platform 102 may cause the QSM to generate the optimization score based on the similarity score and using an optimization score algorithm. For instance, the QSM may execute the optimization score algorithm using the following constraints/parameters for each execution scenario of the plurality of execution scenarios:

If(similarity score)≥50%,then: optimization score=(historical optimization score*similarity score).
If else, then: proceed to next similarity score.

In this example, if the similarity score between the execution scenario and the historical execution scenario is greater than or equal to 50%, the quantum simulation platform 102 may cause the QSM to generate an optimization score for the execution scenario that is equivalent to the product of the historical optimization score (e.g., 50, and/or other scores) and the similarity score (e.g., 60%, and/or other scores greater than or equal to 50%). Else, the QSM model may not generate an optimization score and may proceed to execute the optimization score algorithm using a different similarity score corresponding to a different historical execution scenario.

It should be understood that while the above examples at times refer to a single similarity score, a single execution scenario, and a single optimization score, the quantum simulation platform 102 may perform the functions described above for a plurality of different execution scenarios in generating the plurality of optimization scores. For example, the quantum simulation platform 102 may perform the functions described above to generate an optimization score for each execution scenario of the plurality of execution scenarios. It should also be understood that the above described functions are merely some of the many ways in which the quantum simulation platform 102 may use the QSM to generate the plurality of execution scenarios and/or the plurality of optimization scores, and that in some instances one or more additional or alternative methods may be used to generate optimization scores representing an amount of resources (e.g., time, bandwidth, RAM, CPU usage, and/or other resources) associated with performing a particular execution scenario.

At step 216, the quantum simulation platform 102 may determine an optimal execution scenario. For example, the quantum simulation platform 102 may determine an optimal execution scenario out of the plurality of execution scenarios generated by the QSM (e.g., as described above at steps 214-215). In some examples, the optimal execution scenario may be the execution scenario that corresponds to the lowest number of devices used to execute the optimal execution scenario, the execution scenario that requires the least amount of computing resources (e.g., CPU usage, RAM, or the like), and/or other execution scenarios with other attributes. In determining the optimal execution scenario, the quantum simulation platform 102 may compare some or all of the plurality of optimization scores corresponding to the plurality of execution scenarios to a threshold score. The threshold score may be a value (e.g., integer, percentage, decimal, or the like) included in memory of the quantum simulation platform 102 and/or manually determined by a user (e.g., an employee of the enterprise organization associated with enterprise user device 106, or the like). In comparing the plurality of optimization scores to the threshold score, the quantum simulation platform 102 may identify whether one or more execution scenarios of the plurality of execution scenarios correspond to an optimization score, of the plurality of optimization scores, that satisfies the threshold score. For example, a given optimization score may be 70, and the threshold score may be satisfied by any optimization scores that meet or exceed a value of 50. Accordingly, based on comparing the given optimization score to the threshold score, the quantum simulation platform 102 may determine that the given optimization score meets or exceeds the threshold score and may, in response, select the execution scenario corresponding to the given optimization score as the optimal execution scenario.

In some examples, in selecting the optimal execution scenario, the quantum simulation platform 102 may compare the plurality of optimization scores to the threshold score until a first optimization score that satisfies the threshold score is identified. In these examples, the quantum simulation platform 102 may select the execution scenario corresponding to the first optimization score as the optimal execution scenario without performing any additional comparisons of optimization scores to the threshold score. Additionally or alternatively, in some instances, in selecting the optimal execution scenario the quantum simulation platform 102 may compare each optimization score, of the plurality of optimization scores, to the threshold score. Based on comparing each optimization score the threshold score, the quantum simulation platform 102 may identify a plurality of optimization scores that satisfy the threshold score. In these instances, the quantum simulation platform 102 may then compare each optimization score of the plurality of optimization scores that satisfy the threshold score to each other to identify the optimization score that exceeds every other optimization score of the plurality of optimization scores that satisfy the threshold score. Based on identifying the optimization score that exceeds every other optimization score, the quantum simulation platform 102 may select the execution scenario corresponding to the optimization score that exceeds every other optimization score as the optimal execution scenario. For example, the quantum simulation platform 102 may, based on comparing each optimization score the threshold score, identify three optimization scores that satisfy the threshold score. The three optimization scores may, e.g., be 70, 80, and 90. Based on comparing the three optimization scores to each other, the quantum simulation platform 102 might identify that 90 is the optimization score that exceeds every other optimization score. Accordingly, the quantum simulation platform 102 may select the execution scenario corresponding to the optimization score of 90 as the optimal execution scenario.

Figure 2E:
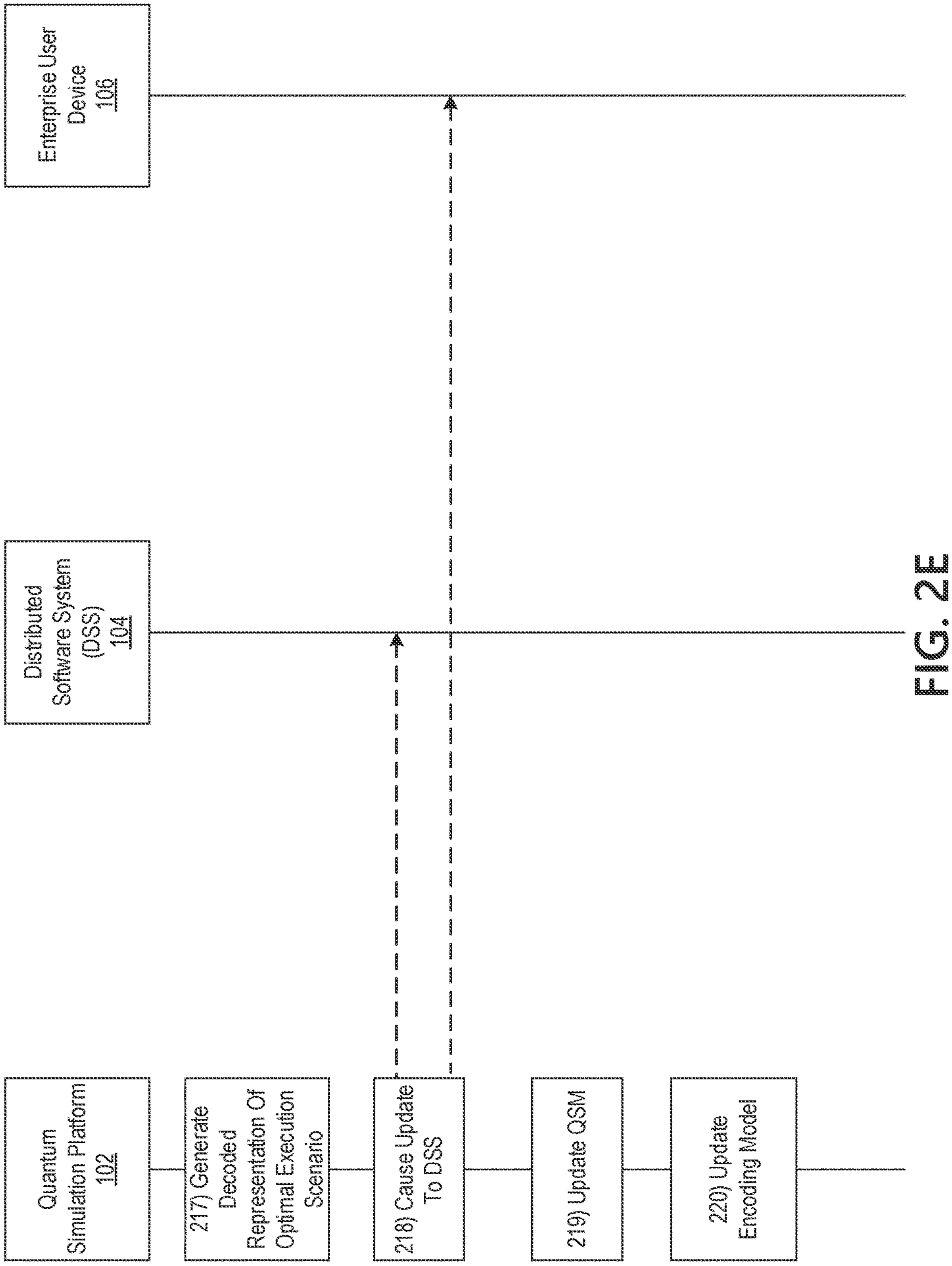

Referring to FIG. 2E, at step 217, the quantum simulation platform 102 may generate a decoded representation of the optimal execution scenario. For example, the quantum simulation platform 102 may apply one or more cryptography techniques (e.g., matrix decoding, or the like) to the source code matrix and to the configuration matrix to retrieve, in a decoded form, all of the information in the source code matrix corresponding to the optimal execution scenario (e.g., the code corresponding to functions used in the optimal execution scenario, instructions indicating in which order to perform the steps of the optimal execution scenario, and/or other information) and all of the information in the configuration matrix corresponding to the execution scenario (e.g., the devices used in the optimal execution scenario, the applications used in the optimal execution scenario, the data distributions used in the optimal execution scenario, and/or other information). In these instances, the quantum simulation platform 102 may generate a representation of the decoded information (e.g., a text file, a code package, and/or other representations).

At step 218, the quantum simulation platform 102 may cause one or more updates to the DSS. The one or more updates to the DSS may be and/or include performing the functions included in the optimal execution scenario. In some instances, the quantum simulation platform 102 may be configured to automatically execute the optimal execution scenario on the DSS without requiring additional input. In these instances, the quantum simulation platform 102 may cause the one or more updates to the DSS via the communication interface 113 and while the first wireless data connection is established. For example, based on the optimal execution scenario, the quantum simulation platform 102 may cause one or more of: adding one or more applications to the DSS, adding source code corresponding to one or more functions to the DSS, removing one or more application from the DSS, removing source code corresponding to one or more function from the DSS, modifying one or more applications included in the DSS, modifying source code corresponding to one or more functions included in the DSS, and/or other updates to the DSS.

Additionally or alternatively, in some examples, the quantum simulation platform 102 may cause the one or more updates to the DSS by sending the decoded representation of the optimal execution scenario to the enterprise user device 106 (e.g., via the communication interface 113 and while the second wireless data connection is established). For example, in sending the decoded representation of the optimal execution scenario to the enterprise user device 106, the quantum simulation platform 102 may additionally send one or more instructions directing the enterprise user device 106 to execute the optimal execution scenario (e.g., by compiling, testing, and/or committing the code, of the source code, identified by the optimal execution scenario). Additionally, in some instances, in sending the decoded representation of the optimal execution scenario, the quantum simulation platform 102 may transmit and cause display of a user interface on the enterprise user device 106. For example, the quantum simulation platform 102 may transmit and cause the enterprise user device 106 to display a DSS update alert interface.

Figure 3:
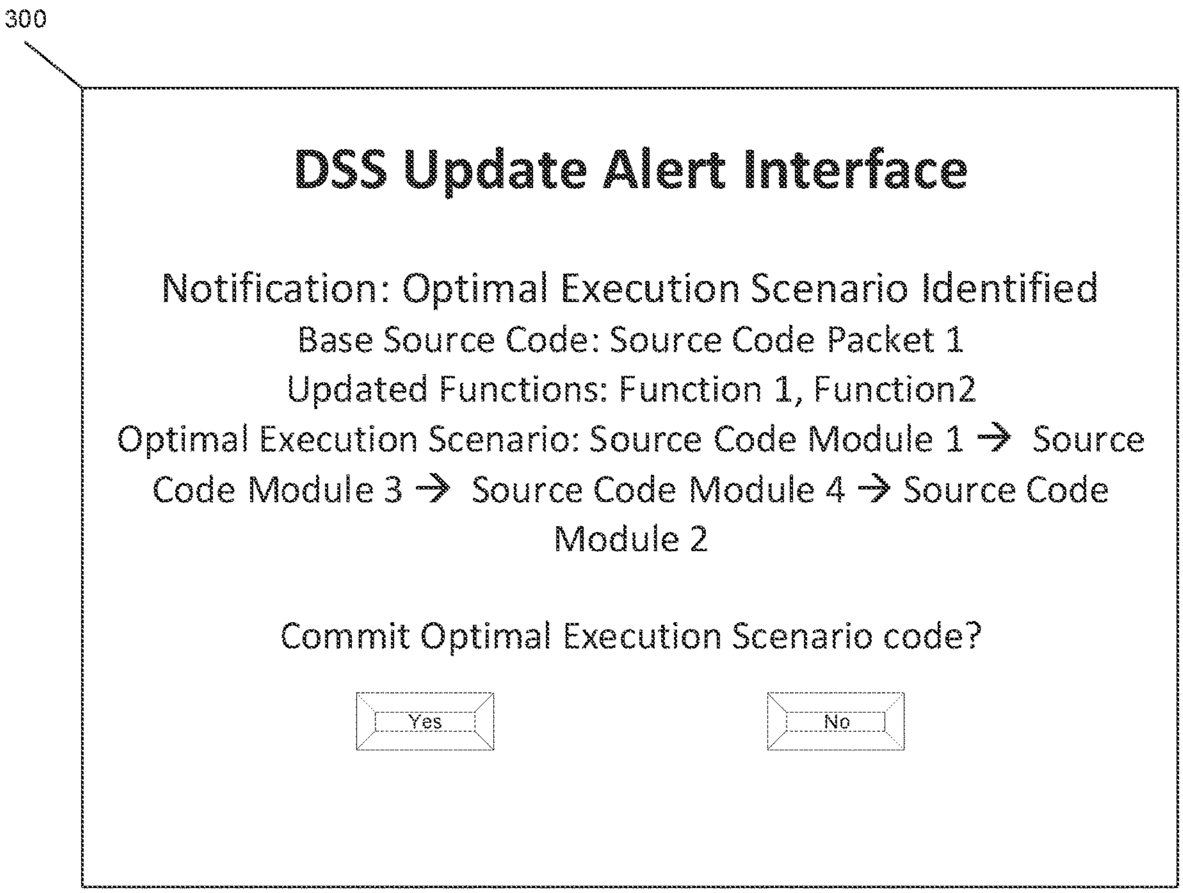
FIG. 3 depicts an illustrative graphical user interface depicting a DSS update alert generated as part of strategizing distributed systems using quantum simulation in accordance with one or more example arrangements.

In displaying the update alert interface, the enterprise user device 106 may display a graphical user interface similar to DSS update alert interface 300, which is illustrated in FIG. 3. Referring to FIG. 3, in some instances, the DSS update alert interface 300 may include information corresponding to the optimal execution scenario. For example, the DSS update alert interface 300 may include information such as a notification that an optimal execution scenario has been identified, an indication of the base source code using to generate the optimal execution scenario (e.g., the source code sent by the enterprise user device 106, and/or other source code), an indication of the functions included in and/or corresponding to the optimal execution scenario, the steps of performing and/or executing the optimal execution scenario, and/or other information. The DSS update alert interface 300 may also display interface elements or selectable options requesting user input. For example, the DSS update alert interface 300 may display one or more of: an information entry field, a button or buttons, toggle or toggles, check box or boxes, and/or other interface elements. For example, as illustrated in FIG. 3, the interface elements may be one or more buttons the user might toggle to commit the optimal execution scenario code. In some instances, based on user input requesting that the optimal execution scenario code be committed, the enterprise user device 106 may commit the optimal execution scenario code and, in response, cause the one or more updates to the DSS 104.

Referring back to FIG. 2E, at step 219, the quantum simulation platform 102 may refine, validate, and/or otherwise update the QSM. For example, the quantum simulation platform 102 may update the QSM based on the optimal execution scenario. In some instances, updating the QSM may include inputting the optimal execution scenario into the QSM. By providing this input into the QSM, the quantum simulation platform 102 may create an iterative feedback loop that may continuously and dynamically refine the QSM to improve its accuracy. For example, based on inputting the optimal execution scenario, the quantum simulation platform 102 may cause the QSM to generate execution scenarios in future iterations of the feedback loop by storing, based on the optimal execution scenario, one or more correlations between the optimal execution scenario and the source code matrix used to generate the optimal execution scenario. For instance, based on identifying that the optimal execution scenario uses three particular devices based on one or more portions of the source code matrix, the quantum simulation platform 102 may cause the QSM to store a correlation between the one or more portions of the source code matrix and the three particular devices. Accordingly, in future iterations of the feedback loop, the QSM may generate an execution scenario that also uses the three particular devices based on receiving input of a source code matrix that includes at least the one or more portions of the source code matrix used to generate the optimal execution scenario.

In updating the QSM, the quantum simulation platform 102 may improve the accuracy and effectiveness of the optimal execution scenario generation and selection processes, which may, e.g., result in more efficient training of machine learning models trained by the quantum simulation platform 102 (and may in some instances, conserve computing and/or processing power/resources in doing so). The quantum simulation platform 102 may further cause the QSM to improve the methods of simulating execution scenarios for a DSS described herein by generating more accurate and/or efficient execution scenarios, as described above.

At step 220, the quantum simulation platform 102 may refine, validate, and/or otherwise update the encoding model. For example, the quantum simulation platform 102 may update the encoding model based on the optimal execution scenario. In some instances, updating the encoding model may include inputting the decoded representation of the optimal execution scenario into the encoding model. By providing this input into the encoding model, the quantum simulation platform 102 may create an iterative feedback loop that may continuously and dynamically refine the encoding model to improve its accuracy. For example, based on inputting the decoded representation of the optimal execution scenario, the quantum simulation platform 102 may cause the encoding model to generate execution scenarios in future iterations of the feedback loop by storing, based on the decoded representation of the optimal execution scenario, one or more correlations between the decoded representation of the optimal execution scenario and one or more encoded vectors corresponding to the optimal execution scenario. For instance, based on identifying that the optimal execution scenario used, e.g., three out of twelve encoded vectors generated by the quantum simulation platform 102 (e.g., using the functions and methods described above at step 208), the quantum simulation platform 102 may store a correlation between the optimal execution scenario and the three encoded vectors indicating that those vectors should be used to generate future optimal execution scenarios. Additionally or alternatively, the quantum simulation platform 102 may store a correlation between the optimal execution scenario and the nine encoded vectors that were not included in the example optimal execution scenario, indicating that those vectors should not generated in future iterations of the feedback loop. Accordingly, in future iterations of the feedback loop, the encoding model may generate a plurality of encoded vectors that includes the three vectors described above and excludes the nine vectors described above, on receiving input of a DAG that includes source code corresponding to the twelve vectors.

In updating the encoding model, the quantum simulation platform 102 may improve the accuracy and effectiveness of the optimal execution scenario generation and selection processes, which may, e.g., result in more efficient training of machine learning models trained by the quantum simulation platform 102 (and may in some instances, conserve computing and/or processing power/resources in doing so). The quantum simulation platform 102 may further cause the encoding model to improve the methods of generating encoded vectors for use strategizing updates to a DSS described herein by generating more accurate and/or preferred encoded vectors, as described above.

Figure 4A:
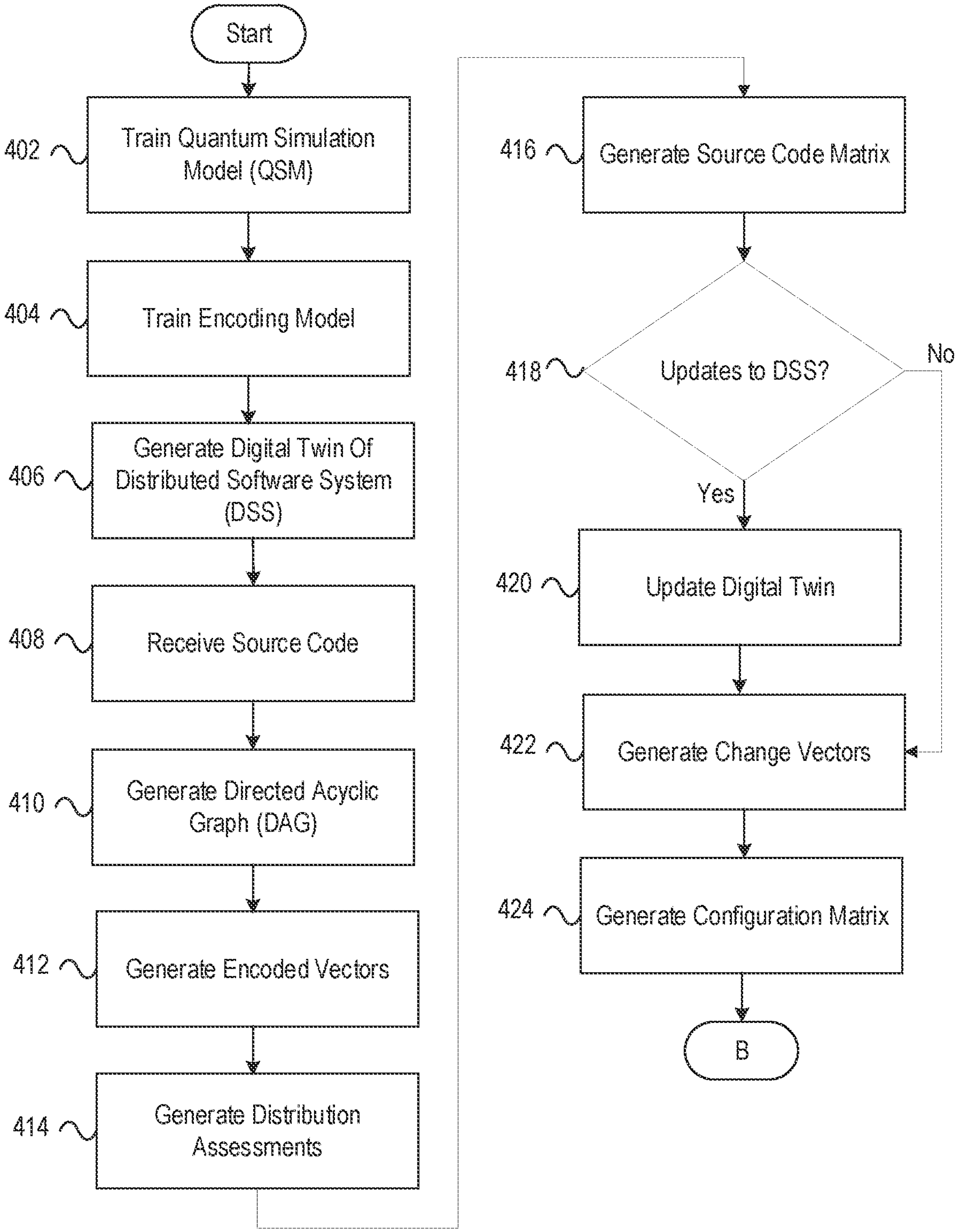
FIGS. 4A-4B depict an illustrative method for strategizing distributed systems using quantum simulation in accordance with one or more example arrangements.
Figure 4B:
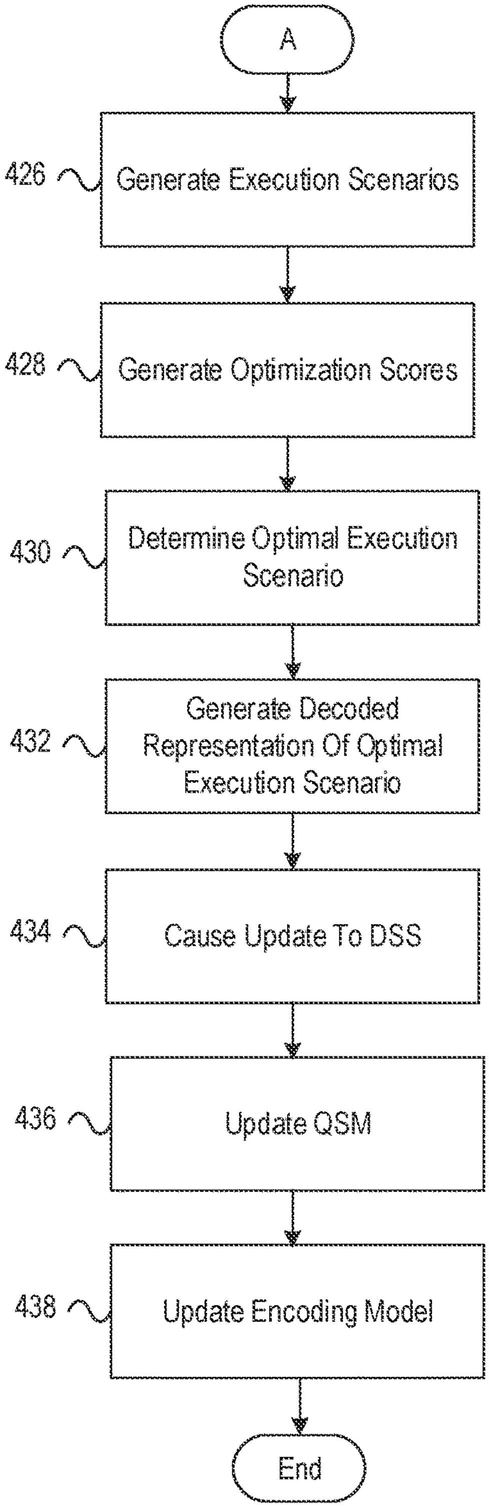

FIGS. 4A-4B depict an illustrative method for strategizing distributed systems using quantum simulation in accordance with one or more example arrangements. Referring to FIG. 4A, at step 402, a computing device having at least one processor, a communication interface, and memory may train a quantum simulation model (QSM). For example, the computing device may train a QSM to generate execution scenarios and corresponding optimization scores based on input of source code matrices and configuration matrices. At step 404, the computing device may train an encoding model. For example, the computing device may train an encoding model to generate encoded vectors based on input of directed acyclic graphs (DAGs). At step 406, the computing device may generate a digital twin of a distributed software system (DSS). At step 408, the computing device may receive source code. For example, the computing device may receive source code for updating the DSS. At step 410, the computing device may generate a DAG based on the source code. At step 412, the computing device may generate a plurality of encoded vectors based on the DAG. At step 414, the computing device may generate a plurality of distribution assessments based on the plurality of encoded vectors. At step 416, the computing device may generate a source code matrix based on the plurality of distribution assessments. At step 418, the computing device may determine whether any updates have been made to the DSS used to generate the digital twin. Based on determining that updates have been made to the DSS, the computing device may proceed to step 420 and update the digital twin. Based on determining that updates have not been made to the DSS, the computing device may proceed to step 422 and generate a plurality of change vectors.

At step 420, based on determining that updates have been made to the DSS, the computing device may update the digital twin based on the updates to the DSS. At step 422, based on updating the digital twin or based on determining that updates have not been made to the DSS, the computing device may generate a plurality of change vectors based on the digital twin. At step 424, the computing device may generate a configuration matrix based on the plurality of change vectors.

Referring to FIG. 4B, at step 426, the computing device may generate a plurality of execution scenarios. For example, the computing device may generate the plurality of execution scenarios based on inputting the source code matrix and the configuration matrix into the QSM. At step 428, the computing device may generate a plurality of optimization scores. For example, the computing device may generate the plurality of optimization scores using the QSM and based on the plurality of execution scenarios. At step 430, the computing device may determine an optimal execution scenario of the plurality of execution scenarios. At step 432, the computing device may generate a decoded representation of the optimal execution scenario. At step 434, the computing device may cause one or more updates to the DSS. At step 436, the computing device may update the QSM based on the optimal execution scenario. At step 438, the computing device may update the encoding model based on the decoded representation of the optimal execution scenario.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular operations or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various arrangements. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative arrangements, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative arrangements thereof. Numerous other arrangements, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:

at least one processor;

a communication interface communicatively coupled to the at least one processor; and memory storing computer-readable instructions that, when executed by the at least one processor, cause the computing platform to:

train a quantum simulation model (QSM) based on a plurality of historical execution scenarios and a plurality of historical optimization scores corresponding to the plurality of historical execution scenarios, wherein training the QSM configures the QSM to output optimization scores based on input of source code matrices and input of configuration matrices;

generate a digital twin of a distributed software system (DSS), wherein the digital twin comprises a virtual representation of the DSS;

generate, by parsing source code corresponding to the DSS, a directed acyclic graph (DAG) of the source code;

generate, using the DAG, a plurality of encoded vectors of the source code and a plurality of distribution assessments, wherein each distribution assessment comprises a potential organization of a plurality of associated encoded vectors, of the plurality of encoded vectors, for performing a function;

generate, based on the plurality of distribution assessments, a source code matrix comprising information of the plurality of distribution assessments;

generate, based on the digital twin, a plurality of change vectors, wherein each change vector comprises configuration information corresponding to the digital twin, and a configuration matrix comprising information of the plurality of change vectors;

generate, based on inputting the source code matrix and the configuration matrix into the QSM, a plurality of execution scenarios for executing the source code and a plurality of optimization scores, wherein each optimization score corresponds to a different execution scenario of the plurality of execution scenarios;

identify an optimal execution scenario;

cause, based on the optimal execution scenario, one or more updates to the DSS; and update, based on the optimal execution scenario, the QSM.

2. The computing platform of claim 1, wherein the memory stores additional computer-readable instructions that, when executed by the at least one processor, cause the computing platform to:

train an encoding model based on a training set of historical DAGs of source code, wherein training the encoding model configures the encoding model to output encoded vectors based on input of DAGs of source code, wherein generating the plurality of encoded vectors of the source code comprises:

inputting the DAG into the encoding model; and mapping variations included in nodes of the DAG to positions of encoded vectors based on correlations indicating similarities between functions included in the source code; and update, based on a decoded representation of the optimal execution scenario, the encoding model.

3. The computing platform of claim 1, wherein the memory stores additional computer-readable instructions that, when executed by the at least one processor, cause the computing platform to:

monitor the DSS;

identify, based on the monitoring, one or more configuration changes to the DSS; and periodically update, based on the one or more configuration changes, the digital twin.

4. The computing platform of claim 1, wherein the digital twin comprises a virtual representation of both a plurality of devices corresponding to the DSS and a plurality of applications included in the DSS.

5. The computing platform of claim 1, wherein the DAG comprises:

a plurality of nodes, wherein each node corresponds to a function included in the source code; and a plurality of edges, wherein each edge corresponds to one or more correlations between functions included in the source code.

6. The computing platform of claim 1, wherein the source code is received by the computing platform and from a developer desk.

7. The computing platform of claim 1, wherein each encoded vector, of the plurality of encoded vectors, corresponds to source code for performing a variant of a function included in the source code.

8. The computing platform of claim 1, wherein the configuration information corresponding to the digital twin comprises:

one or more data distributions of a plurality of devices corresponding to the DSS; and one or more clusters of information corresponding to one or more applications included in the DSS.

9. The computing platform of claim 1, wherein generating the plurality of execution scenarios comprises:

comparing, using the QSM, the source code matrix to the plurality of historical execution scenarios;

identifying, based on the comparing, one or more correlations between the source code and one or more historical execution scenarios of the plurality of historical execution scenarios; and generating, based on the one or more correlations and based on the information of the plurality of distribution assessments, one or more execution scenarios for each variation, of a plurality of variations, of each function included in the source code.

10. The computing platform of claim 1, wherein identifying the optimal execution scenario comprises:

comparing the plurality of optimization scores to a threshold score;

identifying, based on the comparing, a plurality of optimization scores that satisfy the threshold score; and selecting, as the optimal execution scenario, an execution scenario corresponding to an optimization score that satisfies the threshold score and exceeds every other optimization score of the plurality of optimization scores.

11. The computing platform of claim 1, wherein identifying the optimal execution scenario comprises:

comparing the plurality of optimization scores to a threshold score;

identifying, based on the comparing, a first optimization score that satisfies the threshold score; and selecting, as the optimal execution scenario, an execution scenario corresponding to the first optimization score.

12. The computing platform of claim 1, wherein the one or more updates to the DSS comprise one or more of:

adding one or more application to the DSS, adding source code corresponding to one or more functions to the DSS, removing one or more application from the DSS, removing source code corresponding to one or more function from the DSS, modifying one or more applications included in the DSS, or modifying source code corresponding to one or more functions included in the DSS.

13. A method comprising;

at a computing device comprising at least one processor, a communication interface, and memory:

training a quantum simulation model (QSM) based on a plurality of historical execution scenarios and a plurality of historical optimization scores corresponding to the plurality of historical execution scenarios, wherein training the QSM configures the QSM to output optimization scores based on input of source code matrices and input of configuration matrices;

generating a digital twin of a distributed software system (DSS), wherein the digital twin comprises a virtual representation of the DSS;

generating, by parsing source code corresponding to the DSS, a directed acyclic graph (DAG) of the source code;

generating, using the DAG, a plurality of encoded vectors of the source code and a plurality of distribution assessments, wherein each distribution assessment comprises a potential organization of a plurality of associated encoded vectors, of the plurality of encoded vectors, for performing a function;

generating, based on the plurality of distribution assessments, a source code matrix comprising information of the plurality of distribution assessments;

generating, based on the digital twin, a plurality of change vectors, wherein each change vector comprises configuration information corresponding to the digital twin, and a configuration matrix comprising information of the plurality of change vectors;

generating, based on inputting the source code matrix and the configuration matrix into the QSM, a plurality of execution scenarios for executing the source code and a plurality of optimization scores, wherein each optimization score corresponds to a different execution scenario of the plurality of execution scenarios;

identifying an optimal execution scenario;

causing, based on the optimal execution scenario, one or more updates to the DSS; and updating, based on the optimal execution scenario, the QSM.

14. The method of claim 13, wherein generating the plurality of execution scenarios comprises:

comparing, using the QSM, the source code matrix to the plurality of historical execution scenarios;

identifying, based on the comparing, one or more correlations between the source code and one or more historical execution scenarios of the plurality of historical execution scenarios; and generating, based on the one or more correlations and based on the information of the plurality of distribution assessments, one or more execution scenarios for each variation, of a plurality of variations, of each function included in the source code.

15. The method of claim 13, wherein identifying the optimal execution scenario comprises:

comparing the plurality of optimization scores to a threshold score;

identifying, based on the comparing, a plurality of optimization scores that satisfy the threshold score; and selecting, as the optimal execution scenario, an execution scenario corresponding to an optimization score that satisfies the threshold score and exceeds every other optimization score of the plurality of optimization scores.

16. The method of claim 13, wherein identifying the optimal execution scenario comprises:

comparing the plurality of optimization scores to a threshold score;

identifying, based on the comparing, a first optimization score that satisfies the threshold score; and selecting, as the optimal execution scenario, an execution scenario corresponding to the first optimization score.

17. One or more non-transitory computer-readable media storing instructions that, when executed by a computing platform comprising at least one processor, a communication interface, and memory, cause the computing platform to:

train a quantum simulation model (QSM) based on a plurality of historical execution scenarios and a plurality of historical optimization scores corresponding to the plurality of historical execution scenarios, wherein training the QSM configures the QSM to output optimization scores based on input of source code matrices and input of configuration matrices;

generate a digital twin of a distributed software system (DSS), wherein the digital twin comprises a virtual representation of the DSS;

generate, by parsing source code corresponding to the DSS, a directed acyclic graph (DAG) of the source code;

generate, using the DAG, a plurality of encoded vectors of the source code and a plurality of distribution assessments, wherein each distribution assessment comprises a potential organization of a plurality of associated encoded vectors, of the plurality of encoded vectors, for performing a function;

generate, based on the plurality of distribution assessments, a source code matrix comprising information of the plurality of distribution assessments;

generate, based on the digital twin, a plurality of change vectors, wherein each change vector comprises configuration information corresponding to the digital twin, and a configuration matrix comprising information of the plurality of change vectors;

generate, based on inputting the source code matrix and the configuration matrix into the QSM, a plurality of execution scenarios for executing the source code and a plurality of optimization scores, wherein each optimization score corresponds to a different execution scenario of the plurality of execution scenarios;

identify an optimal execution scenario;

cause, based on the optimal execution scenario, one or more updates to the DSS; and update, based on the optimal execution scenario, the QSM.

18. The one or more non-transitory computer-readable media of claim 17, wherein generating the plurality of execution scenarios comprises:

comparing, using the QSM, the source code matrix to the plurality of historical execution scenarios;

identifying, based on the comparing, one or more correlations between the source code and one or more historical execution scenarios of the plurality of historical execution scenarios; and generating, based on the one or more correlations and based on the information of the plurality of distribution assessments, one or more execution scenarios for each variation, of a plurality of variations, of each function included in the source code.

19. The one or more non-transitory computer-readable media of claim 17, wherein identifying the optimal execution scenario comprises:

comparing the plurality of optimization scores to a threshold score;

identifying, based on the comparing, a plurality of optimization scores that satisfy the threshold score; and selecting, as the optimal execution scenario, an execution scenario corresponding to an optimization score that satisfies the threshold score and exceeds every other optimization score of the plurality of optimization scores.

20. The one or more non-transitory computer-readable media of claim 17, wherein identifying the optimal execution scenario comprises:

comparing the plurality of optimization scores to a threshold score;

identifying, based on the comparing, a first optimization score that satisfies the threshold score; and selecting, as the optimal execution scenario, an execution scenario corresponding to the first optimization score.

* * * * *